(12) United States Patent
Rikoski

(10) Patent No.: US 8,326,081 B1
(45) Date of Patent: Dec. 4, 2012

(54) CORRELATION IMAGE DETECTOR

(75) Inventor: Richard Rikoski, Alameda, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 656 days.

(21) Appl. No.: 12/454,484

(22) Filed: May 18, 2009

(51) Int. Cl.
*G06K 9/64* (2006.01)

(52) U.S. Cl. ........... 382/278; 342/25 R; 342/90; 356/33; 375/230; 375/365; 382/103; 382/128; 382/131; 382/145; 382/151; 435/6.11; 702/180; 702/75

(58) Field of Classification Search .................. None
See application file for complete search history.

(56) References Cited

U.S. PATENT DOCUMENTS

| | | | | | |
|---|---|---|---|---|---|
| 3,348,031 | A | * | 10/1967 | Bates et al. .................. | 702/180 |
| 4,074,264 | A | * | 2/1978 | Wilmot ......................... | 342/90 |
| 4,739,401 | A | * | 4/1988 | Sacks et al. ................... | 382/103 |
| 5,195,106 | A | * | 3/1993 | Kazecki et al. ............... | 375/230 |
| 5,604,819 | A | * | 2/1997 | Barnard ........................ | 382/151 |
| 6,452,991 | B1 | * | 9/2002 | Zak ............................... | 375/365 |
| 7,006,682 | B1 | * | 2/2006 | Moriya et al. ................ | 382/145 |
| 7,242,717 | B2 | * | 7/2007 | Li et al. ..................... | 375/240.18 |
| 7,254,500 | B2 | * | 8/2007 | Makeig et al. ................. | 702/75 |
| 8,050,476 | B2 | * | 11/2011 | Dentinger ...................... | 382/131 |
| 2004/0032361 | A1 | * | 2/2004 | Kirscht ........................... | 342/25 |
| 2004/0241670 | A1 | * | 12/2004 | Ghosh et al. ...................... | 435/6 |
| 2005/0105610 | A1 | * | 5/2005 | Sung ........................ | 375/240.01 |
| 2007/0047788 | A1 | * | 3/2007 | Slablaugh et al. ............ | 382/128 |
| 2009/0290778 | A1 | * | 11/2009 | Sun et al. ....................... | 382/131 |
| 2011/0228255 | A1 | * | 9/2011 | Li et al. ........................... | 356/33 |

* cited by examiner

*Primary Examiner* — Tsung-Yin Tsai
(74) *Attorney, Agent, or Firm* — James T. Shepherd

(57) ABSTRACT

A correlation image detector is provided that co-registers sonar images by finding peaks in correlation images. To obtain the peaks, the mean of the absolute values of the correlation coefficients in the correlation image is found and the Rayleigh parameter is determined from the mean. Based on the Rayleigh parameter, an appropriate threshold can be determined using a desired probability of false detection. The threshold can be chosen such that the probability of a single false detection over the expected life of the mission for which correlation detection is being performed is extremely low, e.g., one in a million. The peak value in the image is determined and a correlation is considered detected when the peak value is greater than the product of the threshold and the Rayleigh parameter. If a detection occurs, the correlation image detector returns the transformation that co-registers the two images.

3 Claims, 4 Drawing Sheets

CORRELATION IMAGE DETECTOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

This patent application is related to co-pending patent applications entitled COMPENSATING SONAR IMAGES FOR DIFFERENCES IN TARGET ASPECT, Ser. No. 12/802,453, filed May 17, 2010, COHERENT IMAGE CORRELATION Ser. No. 12/454,485, filed May 18, 2009, GRAZING ANGLE COMPENSATION, Ser. No. 12/802,454, filed May 17, 2010 and SPATIALLY INVARIANT IMAGE FORMATION USING OPEN AND CLOSED APERTURES, Ser. No. 12/454,586), filed May 18, 2009, all these co-pending applications being by the same inventor as this application.

BACKGROUND OF THE INVENTION (1) Field of the Invention

The present invention relates to correlation of sonar images and more specifically to finding peaks in correlation images to co-register sonar images using a threshold based on a statistical model and a desired probability of false detections.

(2) Description of the Prior Art

As is known in the art, there are many applications for which it is necessary to determine the relationship between two images. As an example, forming enhanced apertures according to the open/closed aperture theorem, such as combining grid lines to create "circular Synthetic Aperture Sonar (SAS)" like images, requires one to co-register images created during different survey legs or by different robots.

Also, when navigating using a Kalman filter, the relationship between two images can be compared to a predicted relationship, and the difference can be used to improve the state estimate. In addition, when mosaicking, the relationship between images can be used to stitch images together and generate a single, larger image. Still further, when searching for targets, it is desirable to know that there are targets in an image, and to know where they are.

When correlating two sonar images it is often necessary to determine whether or not the images are of the same object or terrain, and the relative position and orientation of one image with respect to the other. This can require choosing a peak in the correlation image and determining whether its value is significant. For navigational algorithms, it is often desirable to use a detection criterion with a low false alarm rate.

However, the correlation coefficients in a correlation image are difficult to predict as they depend on the amount of structure being imaged, the background noise in the environment, and the degree of frequency and aspect overlap. What are needed are systems and methods for detecting correlation in images.

SUMMARY OF THE INVENTION

It is therefore a general purpose and primary object of the present invention to provide a correlation image detector wherein sonar images are co-registered by finding peaks in correlation images. The peaks are found using a threshold based on a statistical model and a desired probability of false detections. The threshold can be chosen such that the probability of a single false detection over the expected life of the mission for which correlation detection is being performed is extremely low, e.g., one in a million.

To obtain the peaks, the mean of the absolute values of the correlation coefficients in the correlation image is found. As is known in the art and described in further detail hereinafter, the image background follows a Rayleigh distribution. Accordingly, the Rayleigh parameter can be determined from the mean. Based on the Rayleigh parameter, an appropriate threshold can be determined using a desired false detection probability.

The peak value in the image is compared to the product of the threshold and the Rayleigh parameter. A correlation is considered detected when the peak value is greater than the product. If a detection occurs, the correlation image detector returns the transformation that co-registers the two images, which can include translations and rotations.

In one embodiment, a correlation image detector comprises the steps of obtaining a mean of absolute values of correlation coefficients in a correlation image; determining a Rayleigh parameter from the mean; determining a threshold value based on a desired false detection probability; and registering a detection if a peak one of the correlation coefficients exceeds a product of the threshold and the Rayleigh parameter.

In another embodiment, the correlation image detector further comprises correlating a plurality of coherent sonar images to obtain the correlation image, wherein the correlation image comprises a matrix showing correlation coefficients vs. spatial translation or spatial translation and rotations.

In a further embodiment, the mean, $\bar{\rho}$, is obtained from the relationship $$\bar{\rho} = \frac{1}{MN}\sum_{i=1}^{M}\sum_{j=1}^{N}|\rho(i,j)|,$$

where M and N are dimensions of the correlation image and $\rho(i,j)$ denotes the correlation coefficients. The Rayleigh parameter, s, can be determined from the relationship $$s = \bar{\rho}\sqrt{\frac{2}{\pi}}.$$

The threshold, T, can be determined from the relationship $$P(|\rho| > Ts) = 1 - \left(1 - e^{-\frac{T^2}{2}}\right)^{MN},$$

where $P(|\rho|>Ts)$ denotes the false detection probability.

In another embodiment, the correlation image detector further comprises obtaining, from the correlation image, the spatial translation and/or spatial translation and rotations corresponding to the peak.

In another embodiment, the plurality of correlation images comprises a set of correlation images, each image of said set corresponding to a different rotation and registering a detection further comprises determining if the peak one of the correlation coefficients exceeds a stored peak, replacing the stored peak with the peak one when the peak one exceeds the stored peak, and returning to obtaining a mean for a next one of set, wherein, upon completing the set, the rotation corresponding to the stored peak is a preferred rotation.

On one embodiment, a correlation image detector comprises the steps of correlating a plurality of coherent sonar images to obtain a correlation image, wherein the correlation image comprises a matrix showing correlation coefficients vs. spatial translation or spatial translation and rotations; obtaining a mean, $\bar{\rho}$, of absolute values of the correlation coefficients in the correlation image from the relationship $$\bar{\rho} = \frac{1}{MN}\sum_{i=1}^{M}\sum_{j=1}^{N}|\rho(i,j)|,$$

where M and N are dimensions of the correlation image, and $\rho(i,j)$ denotes the correlation coefficients; determining a Rayleigh parameter; s, from the mean from the relationship $$s = \bar{\rho}\sqrt{\frac{2}{\pi}};$$

determining a threshold value, T, based on a desired false detection probability from the relationship $$P(|\rho| > Ts) = 1 - \left(1 - e^{\frac{-T^2}{2}}\right)^{MN},$$

where $P(|\rho|>Ts)$ denotes the false detection probability; registering a detection if a peak one of the correlation coefficients exceeds the product of the threshold and the Rayleigh parameter; and obtaining, from the correlation image, the spatial translation and/or spatial translation and rotations corresponding to the peak.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

As previously described herein, the correlation coefficients in a correlation image are difficult to predict as they depend on the amount of structure being imaged, the background noise in the environment, and the degree of frequency and aspect overlap. To understand correlation image detection, it is helpful to decompose the image into two parts—the peak, and the background noise.

The peak corresponds to the correct co-registration and only occurs if images overlap. The background noise occurs in all correlation images, and corresponds to incorrect co-registrations. The number of pixels composing the peak is often small. On the other hand, the number of pixels that contain only noise is very large. In a typical image having millions of pixels, the peak, including sidelobes, may be fewer than 50 pixels, while those containing only noise may be on the order of millions of pixels.

As a consequence, even in images with strong peaks it is usually possible to calculate the statistics of the noise simply by calculating statistics for the entire image. The pixels corresponding to the peak are usually so few that they fail to significantly bias the noise statistics. However, the signal to noise ratio is often very good.

Figure 1A:
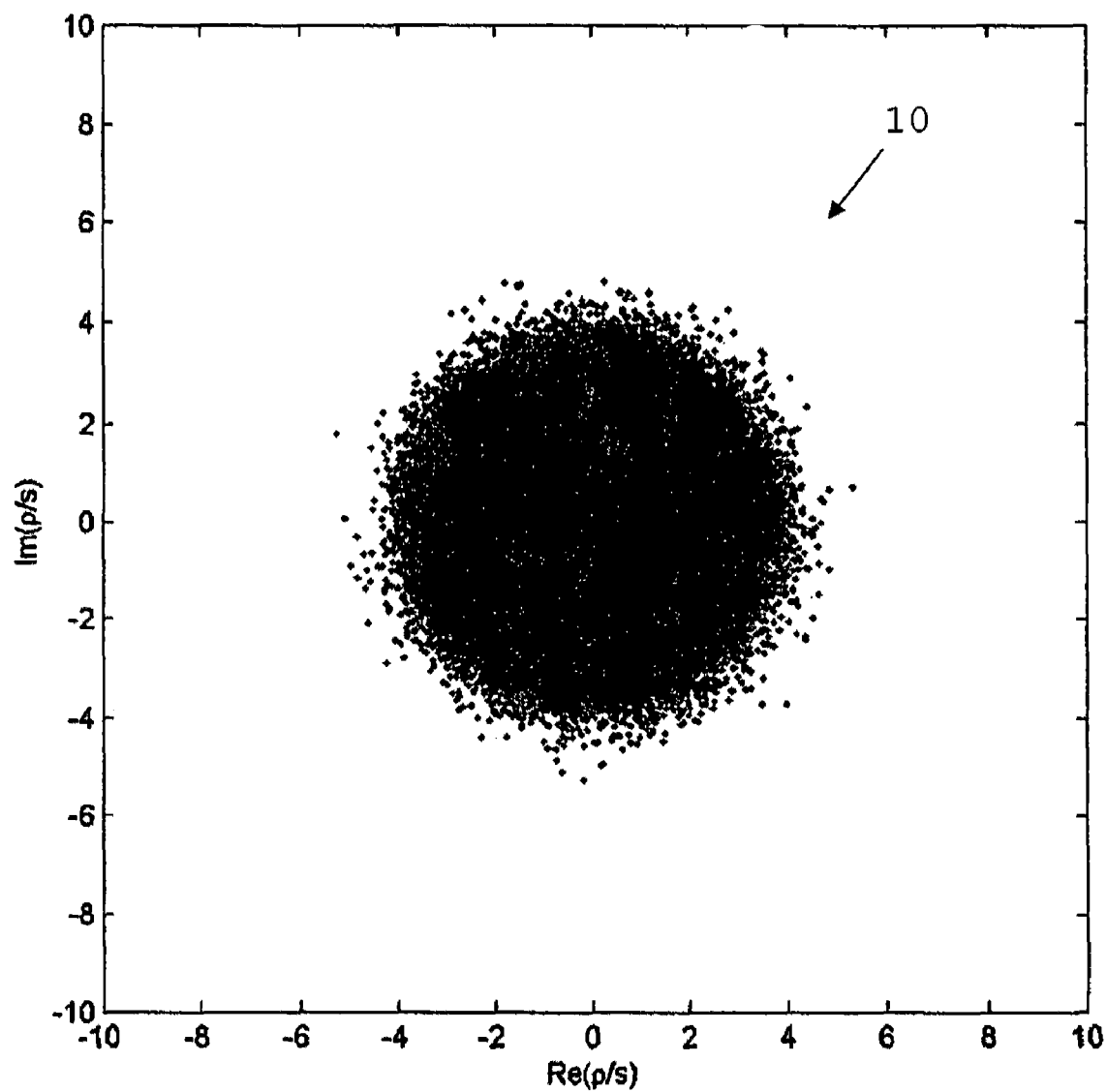
FIG. 1A illustrates a scatter plot of correlation coefficients of two non-overlapping images.
Figure 1B:
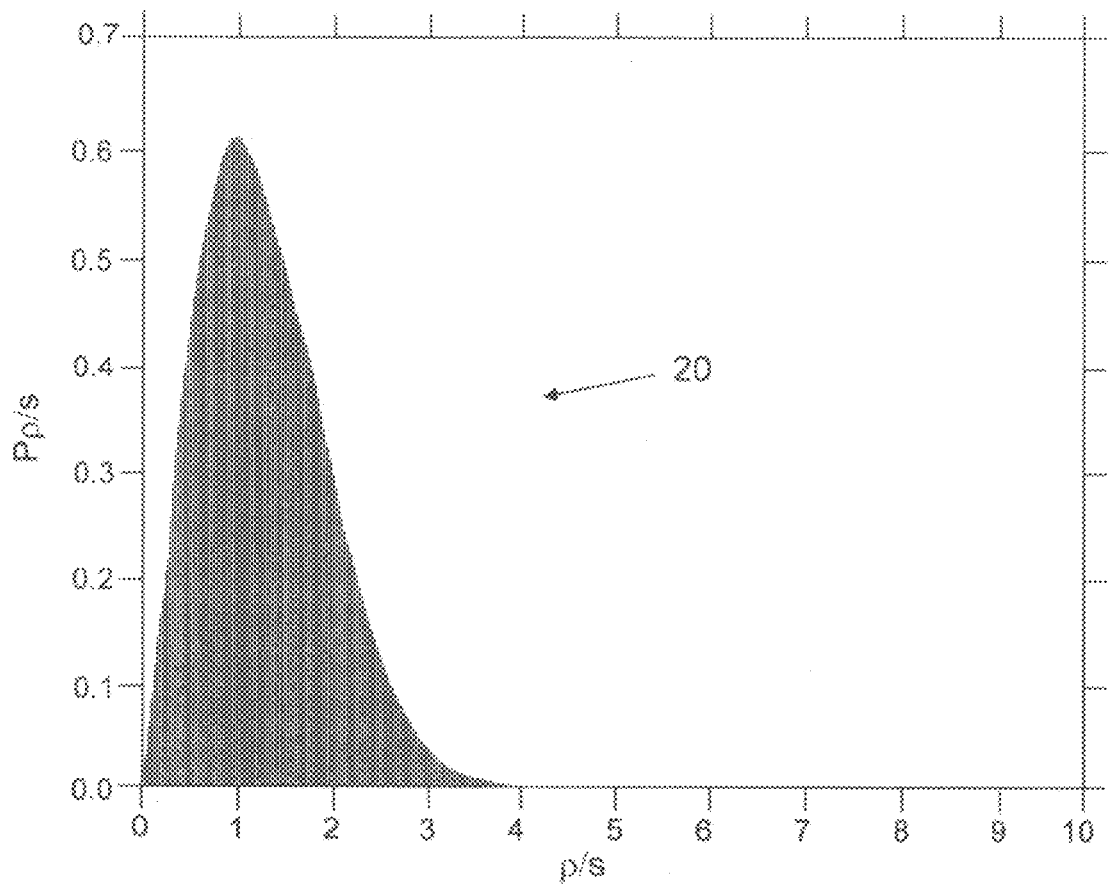
FIG. 1B illustrates a plot of the absolute value of the correlation coefficients for the data of FIG. 1A.

Referring now to FIG. 1A, there is shown scatter plot 10 of the complex correlation coefficients corresponding to the correlation of two non-overlapping images. Referring also to FIG. 1B, there is shown a plot 20 of the absolute value of the correlation coefficients for the data of FIG. 1A.

Those of skill in the art will recognize that plot 20 corresponds well with a theoretical Rayleigh distribution. Accordingly, both scatter plot 10 and plot 20 are normalized by the Rayleigh parameter, $$s = \bar{\rho}\sqrt{\frac{2}{\pi}},$$

where $\bar{\rho}$ is the mean of the absolute values of the correlation coefficients in the correlation image.

The x and y axes in FIG. 1A respectively correspond to the real and imaginary parts of the correlation coefficients in the image. Scatter plot 10 includes roughly three million points. As shown in scatter plot 10, the data all lies within 6 Rayleigh parameters of zero.

Figure 2:
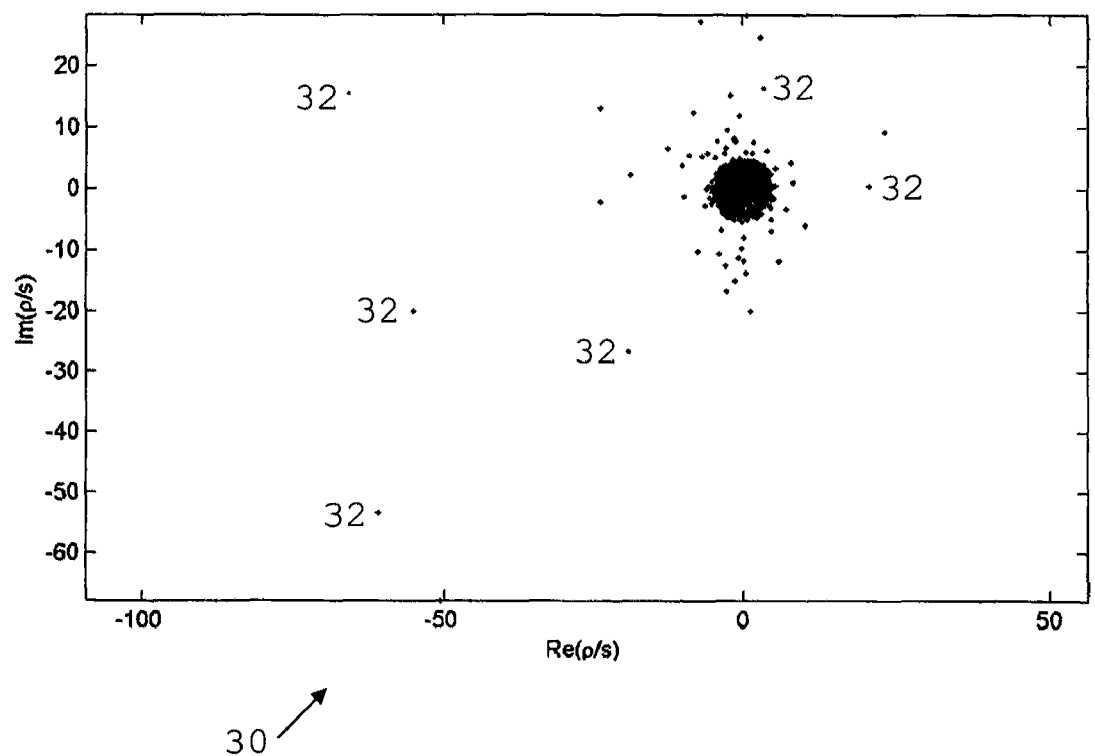
FIG. 2 illustrates a scatter plot of correlation coefficients of two images of the same topographical area.

By comparison, FIG. 2 illustrates a scatter plot 30 of the complex correlation coefficients corresponding to the correlation of two images of the same topographical area. Being of the same topographical area, the images are correlated and there is a peak in the correlation, which greatly exceeds the magnitude of the noise.

Scatter plot 30 shows approximately the same number of data points as shown in FIG. 1A, with roughly three million points about (0,0). However, 50 or so outliers 32 are somewhat distant from the center gathering. (For clarity of illustration, only a limited number of outliers 32 are designated in FIG. 2.) Outliers 32 are due to the peak in the correlation and allow for robust detection since they are highly unlikely based on the statistics of the noise distribution.

Figure 3:
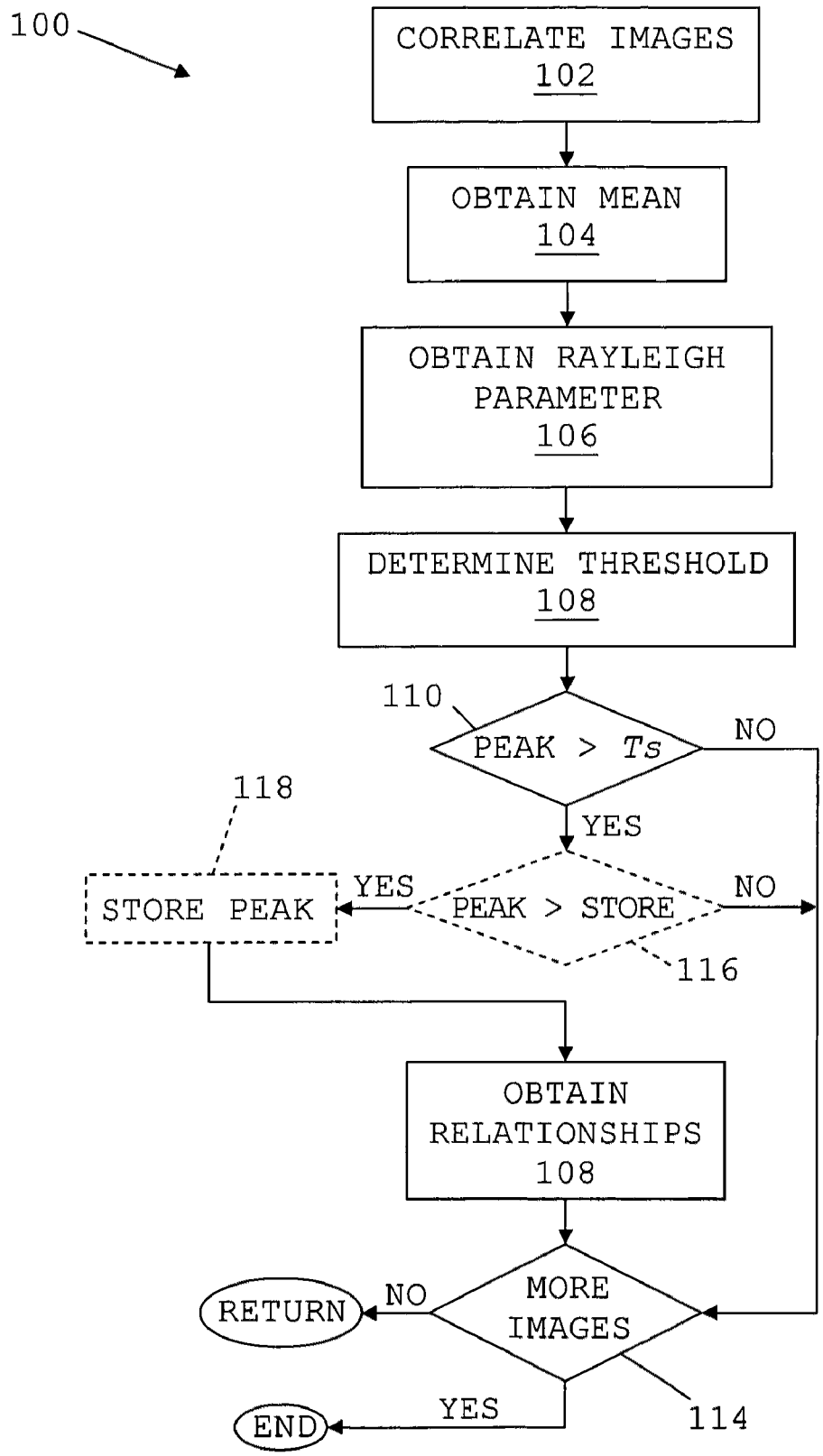
FIG. 3 illustrates a block diagram of a method for implementing the correlation image detector.

Referring now to FIG. 3, there is shown a block diagram of a method 100 for correlation image detection. At block 102, coherent sonar images are correlated to obtain an M×N correlation image showing correlation coefficient vs. translation. Block 104 obtains the mean, $\bar{\rho}$, of the absolute values of the correlation coefficients, $\rho(i,j)$, in the correlation image of block 102, where $$\bar{\rho} = \frac{1}{MN}\sum_{i=1}^{M}\sum_{j=1}^{N}|\rho(i,j)|.$$

At block 106, the Rayleigh parameter, s, is determined from the mean as previously described with respect to FIGS. 1A and 1B.

At block 108, a threshold, T, is determined based on the desired false detection probability. The probability that the peak value of the correlation coefficients, $\bar{\rho}$, is greater than the product of the threshold and the Rayleigh parameter is determined by the relationship $$P(|\rho| > Ts) = 1 - \left(1 - e^{\frac{-T^2}{2}}\right)^{MN}.$$

If multiple, or Q correlations are required, then $$P(|\rho| > Ts) = 1 - \left(1 - e^{\frac{-T^2}{2}}\right)^{MN}.$$

As an example, for an image with M×N=3 million pixels and a requirement for one thousand correlations, the likelihood of a false detection is approximately one in a million if T=8.50.

Block 110 compares the peak correlation coefficient value of the image to the product Ts. If |ρ|>Ts, then a correlation is deemed detected. Upon detection, block 112 uses the peak value in the correlation image to obtain the corresponding translational relationship between the two coherent sonar images. If further images are to be processed, as determined at block 114, method 100 returns to block 102.

What has thus been described is a correlation image detector that finds peaks in correlation images to co-register sonar images using a threshold based on a statistical model and a desired probability of false detections. Coherent images are correlated to obtain a correlation image. The mean of the absolute values of the correlation coefficients is used to obtain the Rayleigh parameter. A false detection threshold value is determined based on a desired probability of false detections.

A correlation is detected if the absolute value of one or more correlation coefficients is greater than the product of the Rayleigh parameter and the threshold value. The translational relationship of the coherent images corresponding to the peak correlation coefficients are obtained from the correlation image.

Obviously many modifications and variations of the present invention may become apparent in light of the above teachings. For example, the method can be applied to radar imagery as well sonar imagery. Additionally, the correlation image may be in the form of a multi-dimensional matrix showing correlation vs. spatial translation and rotations.

In this case, there can be a set of correlation images corresponding to different rotations. Referring again to FIG. 3, there are shown in phantom blocks 116 and 118 for determining the peak correlation value for the set of correlation images.

At block 116, the current peak value is compared to a stored peak value. In the first iteration of method 100, the stored peak value would be null. If the current peak is greater than the stored peak, as determined at block 116, the current peak then becomes the stored peak at block 118 and method 100 continues as before. The relationships obtained at block 108 now include translational and rotational relationships of the coherent images corresponding to the peak correlation coefficients.

It will be understood that many additional changes in details and arrangements of diagrams, which have been described herein and illustrated in order to explain the nature of the invention, may be made by those skilled in the art within the principle and scope of the invention as expressed in the appended claims.

What is claimed is:

1. A method for detecting correlation between images, comprising the steps of:
    obtaining a mean of absolute values of correlation coefficients in a correlation image;
    determining a Rayleigh parameter from said mean;
    determining a threshold value based on a desired false detection probability; and
    registering a detection if a peak one of said correlation coefficients exceeds a product of said threshold and said Rayleigh parameter;
    wherein said mean is obtained from the relationship $$\bar{\rho} = \frac{1}{MN} \sum_{i=1}^{M} \sum_{j=1}^{N} |\rho(i,j)|,$$

where:
$\bar{\rho}$ denotes said mean;
M and N are dimensions of said correlation image; and
$\rho(i,j)$ denotes said correlation coefficients; and
wherein said Rayleigh parameter is determined from the relationship $$s = \bar{\rho}\sqrt{\frac{2}{\pi}},$$

where s denotes said Rayleigh parameter.

2. A method according to claim 1, wherein said threshold is determined from the relationship $$P(|\rho| > Ts) = 1 - \left(1 - e^{\frac{-T^2}{2}}\right)^{MN},$$

where:
P(|ρ|>Ts) denotes said false detection probability; and
T denotes said threshold.

3. A method according to claim 2, further comprising obtaining, from said correlation image, a spatial translation corresponding to said peak.

* * * * *